US008852773B2

(12) United States Patent
Yoon

(10) Patent No.: US 8,852,773 B2
(45) Date of Patent: Oct. 7, 2014

(54) BATTERY PACK

(75) Inventor: Ji-Hyoung Yoon, Yongin-si (KR)

(73) Assignees: Samsung SDI Co., Ltd., Giheung-gu, Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 134 days.

(21) Appl. No.: 13/421,482

(22) Filed: Mar. 15, 2012

(65) Prior Publication Data

US 2012/0237804 A1    Sep. 20, 2012

(30) Foreign Application Priority Data

Mar. 16, 2011 (KR) ........................ 10-2011-0023351

(51) Int. Cl.
*H01M 2/36* (2006.01)
*H01M 10/60* (2014.01)

(52) U.S. Cl.
CPC ...... *H01M 2/36* (2013.01); *Y02E 60/12* (2013.01); *H01M 10/50* (2013.01)
USPC ............. 429/72; 429/149; 429/153; 429/121; 429/122

(58) Field of Classification Search
USPC .............................. 429/72, 149, 153, 121, 122
See application file for complete search history.

(56) References Cited

U.S. PATENT DOCUMENTS

| | | | |
|---|---|---|---|
| D181,302 S | 10/1957 | Logan et al. | |
| D424,525 S | 5/2000 | Katwala | |
| 7,867,663 B2 | 1/2011 | Park et al. | |
| D676,814 S | 2/2013 | Paul | |
| D688,211 S | 8/2013 | Xue et al. | |
| 2007/0231678 A1 | 10/2007 | Park et al. | |

FOREIGN PATENT DOCUMENTS

| | | |
|---|---|---|
| JP | 2008-311016 A | 12/2008 |
| JP | 2010-097872 | 4/2010 |
| KR | 10-2005-0018518 | 2/2005 |
| KR | 2006-0027579 A | 3/2006 |
| KR | 10-2009-0018417 | 2/2009 |
| KR | 10-0932214 | 12/2009 |
| KR | 10-0932214 B1 | 12/2009 |

OTHER PUBLICATIONS

Korean Office Action issued on Sep. 17, 2012 by the KIPO for the corresponding Korean Patent Application No. 10-2011-0023351.
Korean Notice of Allowance issued on Mar. 25, 2013 in the corresponding Korean Patent Application No. 10-2011-0023351.
Definition of Junction Box from Webster dict online (http://www.merriam-webster.com/dictionary/junction%20box).
Definition of Junction Box from Wikipedia (http://en.wikipedia.org/wiki/Junction_box).

*Primary Examiner* — Jane Rhee
(74) *Attorney, Agent, or Firm* — Robert E. Bushnell, Esq.

(57) ABSTRACT

A battery pack capable of improving heat dissipation characteristics and reducing the temperature variation between cells. A battery pack includes at least one battery module including a plurality of battery cells aligned in one direction, a housing that accommodates the at least one battery module and includes a coolant flow path arranged therein and a junction box arranged at a predetermined location in a vicinity of the battery module, the junction box having a sleeve arranged parallel to the coolant flow path.

20 Claims, 8 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on 16 Mar. 2011 and there duly assigned Serial No. 10-2011-0023351.

BACKGROUND OF THE INVENTION

1. Field of the Invention

An aspect of the present invention relates to a battery pack capable of improving heat dissipation characteristics and reducing the temperature variation between cells.

2. Description of the Related Art

In general, secondary batteries are rechargeable and can be repeatedly used. The secondary batteries may be implemented as a battery cell used in portable small-sized electronic devices such as a cellular phone, a desktop computer, a laptop computer, a camera and camcorder. Alternatively, the secondary batteries may be implemented as a battery pack including a plurality of battery cells, used as a power source for driving motors of a high-power hybrid electric vehicle (HEV), an electric vehicle (EV), and the like.

Meanwhile, wires for supply electricity to various electric equipment and motor driving devices are connected through a junction box. Resistors, fuses, relays and the like are installed in the junction box as protection devices against overcurrent and overload.

Therefore, heat generation components such as resistors, fuses or relays generate a large amount of heat, and the heat further deteriorates battery cells close to the junction box, thereby resulting in unequal deterioration between cells in the battery pack. Accordingly, what is needed is a design for a battery pack with a structure capable of improving heat dissipation characteristics.

SUMMARY OF THE INVENTION

Embodiments provide a battery pack capable of improving heat dissipation characteristics and reducing the temperature variation between cells.

Embodiments also provide a battery pack in which a heatsink structure is disposed within a junction box so as to cool heat generated from an electronic component within the junction box, thereby preventing the deterioration of battery cells.

According to an aspect of the present invention, there is provided a battery pack including at least one battery module including a plurality of battery cells aligned in one direction, a housing that accommodates the at least one battery module and includes a coolant flow path arranged therein and a junction box arranged at a predetermined location in a vicinity of the battery module, the junction box having a sleeve arranged parallel to the coolant flow path.

The housing may be provided with at least one inlet through which a coolant may enter the housing. The housing may be provided with at least one outlet through which a coolant may be discharged from the housing. The outlet for the housing may be the sleeve of the junction box. The sleeve may be arranged parallel to the outlet. The junction box may include at least a first sleeve and a second sleeve. The first and the second sleeves may be arranged parallel to each other and are space-apart from each other by a predetermined interval.

When defining six surfaces of the junction box as a bottom surface adjacent to a bottom surface of the housing, a top surface opposite to the bottom surface, a first surface adjacent to the battery module, and second, third and fourth surfaces arranged clockwise with respect to the first surface, the third surface may be disposed adjacent to a coolant outlet surface of the housing. The third surface of the junction box is spaced-apart from a vertical center line of the coolant outlet surface. The third surface of the junction box may be arranged at a corner of the coolant outlet surface. The third surface of the junction box may instead be arranged at a vertical center line of the coolant outlet surface. One of the second and fourth surfaces of the junction box may be arranged adjacent to a side surface of the housing that comes in contact with the coolant outlet surface. The second and fourth surfaces of the junction box may be arranged adjacent to respective side surfaces of the housing.

The battery pack may include a plurality of junction boxes spaced-apart from each other by a predetermined interval. The junction box may include an electronic component that is in contact with an outer wall of the sleeve. The electronic component may be a heat generating element. The junction box may include a heat dissipation member arranged on an inner wall of the sleeve. The heat dissipation member may be a heat dissipation fin. The is junction box may include a plurality of heat dissipation members arranged at a predetermined interval on the inner wall of the sleeve. A section of the sleeve in a thickness direction may have a shape selected from a group consisting of a circle, an ellipse and a polygon. The battery pack may include a coolant including a fluid selected from a group consisting of a liquid and a gas. The sleeve may include a through-hole through which the coolant may flow therethrough.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
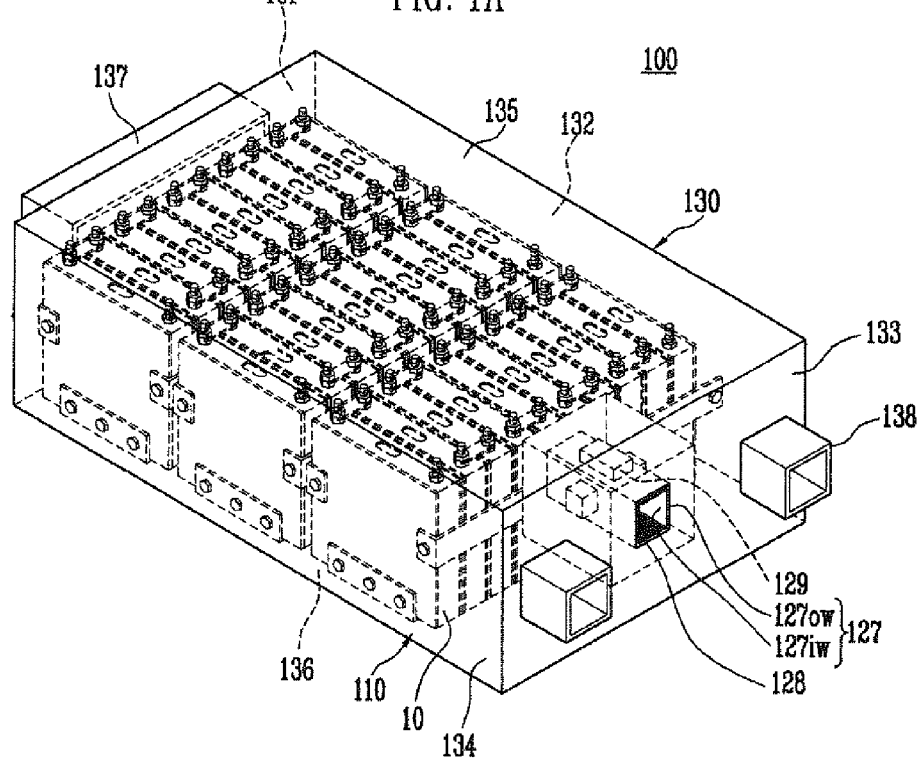
FIG. 1A is a perspective view schematically showing a battery pack according to a first embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, embodiments of the present invention will be described in detail with reference to the accompanying drawings.

First, a battery pack according to a first embodiment of the present invention will be described with reference to FIGS. 1A to 2. FIG. 1A is a perspective view schematically showing a battery pack 100 according to a first embodiment of the present invention, FIG. 1B is a perspective view showing a junction box 120 included in the battery pack 100 of FIG. 1 and FIG. 2 is a perspective view showing a battery module 110 included in the battery pack 100 according to the first embodiment of the present invention.

The battery pack 100 according to the first embodiment of the present invention includes at least one battery module 110 having a plurality of battery cells 10 aligned in one direction, a housing 130 that accommodates the at least one battery module 110 and has a flow path of a coolant formed therein and a junction box 120 having a sleeve 127 disposed parallel to the flow path.

Figure 1B:
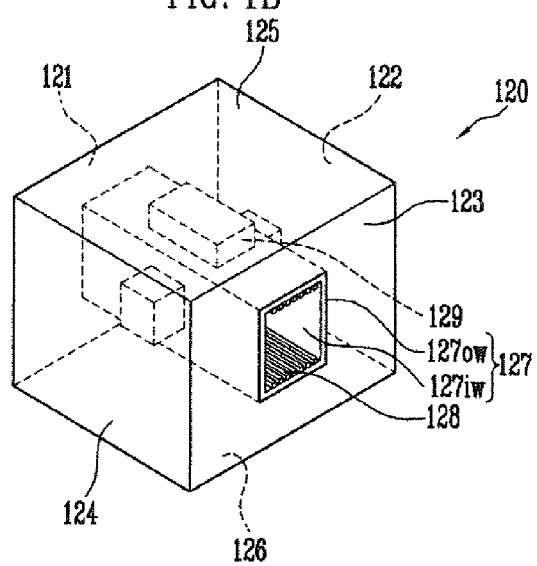
FIG. 1B is a perspective view showing a junction box included in the battery pack of FIG. 1.
Figure 2:
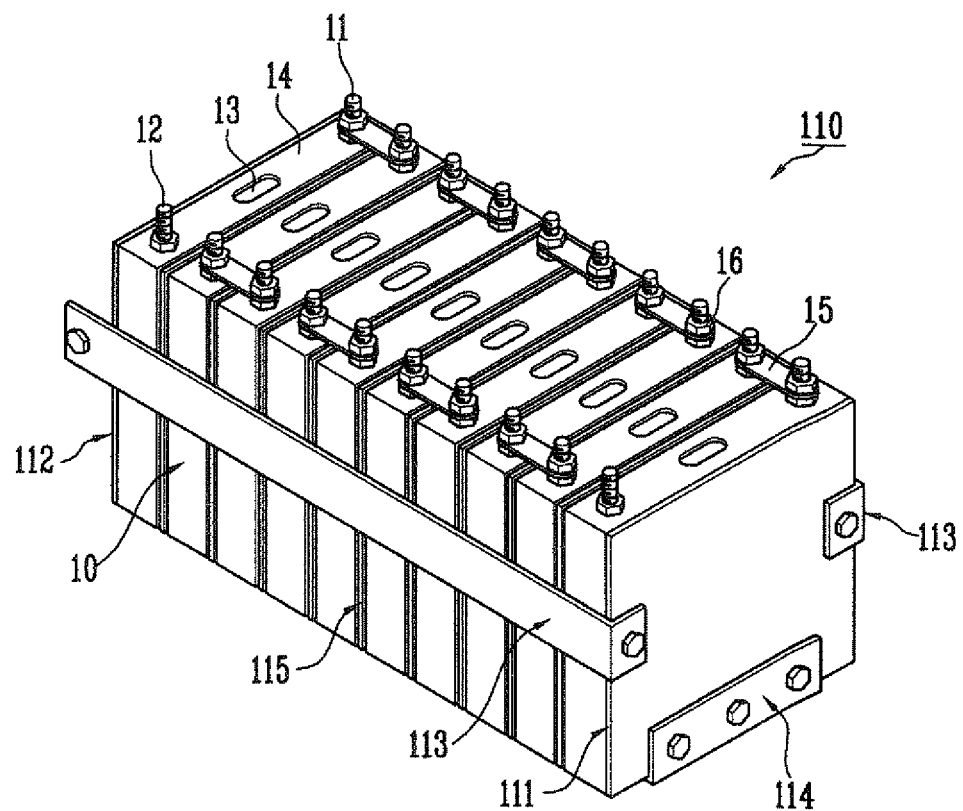
FIG. 2 is a perspective view showing a battery module included in the battery pack according to the first embodiment of the present invention.

Referring to FIGS. 1A and 1B, the housing 130 may accommodate the at least one battery module 110, and a plurality of battery modules 110 may be aligned so that side surfaces of the battery cells 10 are opposite to each other.

The six surfaces of the housing 130 are defined by a housing bottom surface 136 adjacent to a bottom surface 126 of the junction box 120, a housing top surface 135 opposite to the housing bottom surface 136, a coolant inlet surface 131 having an inlet 137 formed thereon, a coolant outlet surface 133 having an outlet 138 formed thereon, a first housing side surface 132 simultaneously positioned between the coolant inlet surface 131 and the coolant outlet surface 133 and between the housing bottom surface 136 and the housing top surface 135, and a second housing side surface 134 opposite to the first housing side surface 132.

The coolant that cools the battery cells 10 is injected into the battery pack 100 through the inlet 137 formed on the coolant inlet surface 131 of the housing 130. Subsequently, the coolant passes through neighboring spaces of the battery cells 10 and spaces respectively formed between the battery cells 10 by barriers 115, and is then discharged to the exterior of the battery pack 100 through the outlet 138 formed on the coolant outlet surface 133 of the housing 130. Thus, the flow path of the coolant, which is configured as the inlet 137, the neighboring spaces of the battery cells 10, the spaces between the battery cells 10 and the outlet 138, is formed within the housing 130.

As described above, the housing 130 is provided with the inlet 137 through which the coolant enters the housing 130 and the outlet 138 through which the coolant is discharged from the housing 130.

The junction box 120 having the sleeve 127 is provided between the battery module 110 and the coolant outlet surface 133 of the housing 130. Here, the sleeve 127 is formed parallel to the flow path of the coolant. On the inside of sleeve 127 is a through-hole or a passageway through which the coolant may flow.

The six surfaces of the junction box 120 is defined by the bottom surface 126 adjacent to the housing bottom surface 136, a top surface 125 opposite to the bottom surface 126, a first surface 121 adjacent to the battery module 110, and second, third, fourth surfaces 122, 123 and 124 disposed clockwise with respect to the first surface 121. The third surface 123 positioned closest to the housing 130 among the surfaces of the junction box 120 of FIG. 1 is disposed adjacent to the coolant outlet surface 133 of the housing 130. Coolant that passes through sleeve 127 of junction box 120 also passes through a corresponding hole in the coolant outlet surface 133 so that the coolant that passes through the junction box 120 can be immediately expelled from housing 130 of battery pack 100. As a result, sleeve 127 can serve as a coolant outlet for the battery pack 100.

In the first embodiment, the junction box 120 may be disposed so that the center of the third surface 123 corresponds to that of the coolant outlet surface 133 of the housing 130. That is, the junction box 120 may be disposed at the center of the coolant outlet surface 133 of the housing 130 so that a vertical center line of the junction box 120 lines up with a vertical center line of the coolant outlet surface 133 of housing 130.

An electronic component 129 is provided within the junction box 120. The electronic component 129 is disposed to come in contact with an outer wall 127ow of the sleeve 127. Meanwhile, a heat dissipation member 128 formed in the shape of a heat dissipation fin is provided to an inner wall 127iw of the sleeve 127. The heat dissipation member 128 is provided with a plurality of heat dissipation members and the plurality of heat dissipation members are disposed at a predetermined interval on the inner wall 127iw of the sleeve 127.

Here, the electronic component 129 is a heat generating component that generates a large amount of heat, such as a resistor, fuse or relay, which is a protection element against overcurrent and overload. The heat generated by the electronic component as described above may deteriorate the battery cells 10 and cause a non-uniform temperature distribution among the battery cells 10 within housing 130.

However, in the present invention, the heat dissipation member 128 is disposed on the inner wall 127iw of the sleeve 127, which comes in contact with the electronic component 129 of the junction box 120, so that the electronic component 129 can be easily cooled. Since the coolant flows through the sleeve 127 while coming in contact with the inner wall 127iw of the sleeve 127, the heat dissipation efficiency of the heat dissipation member 128 can be more improved. Further, the sleeve 127 is formed in the junction box 120, so that it is possible to reduce a pressure drop generated because the flow of the coolant is conventionally slowed down by the front of the junction box. Thus, the heat dissipation efficiency can be more improved, and the temperature variation between the battery cells can be decreased.

Here, the section of the sleeve 127 in the thickness direction may have various shapes such as a circular shape, an elliptic shape or a polygonal shape. Although the heat dissipation fin has been described as an example of the shape of the heat dissipation member 128, the heat dissipation member 128 is not limited thereto. Although it has been described as an example that the heat dissipation member 128 is formed at a portion of the inner walls 127iw of the sleeve 127, the heat dissipation member 128 may instead be formed on the whole of the inner walls 127*iw*. Meanwhile, a fluid, such as a liquid or gas may be used as the coolant.

The battery module 110 accommodated within the housing 130 will be described with reference to FIG. 2. The battery module 110 includes a plurality of battery cells 10 aligned in one direction, and each of the battery cells is provided with positive and negative electrode terminals 11 and 12. The battery cells 10 are aligned so that wide surfaces of adjacent battery s cells 10 are facing each other.

Each of the battery cells 10 that constitute the battery module 110 may be manufactured by accommodating an electrode assembly and an electrolyte into a battery case and then sealing the battery case in which the electrolyte and the electrode assembly is accommodated using a cap plate 14. Here, the electrode assembly includes a positive electrode plate, a negative electrode plate and a separator interposed between the electrode plates. The cap plate 14 may be provided in the state that the positive electrode terminal 11 connected to the positive electrode plate and the negative electrode terminal 12 connected to the negative electrode plate are protruded to the exterior thereof. Here, the positive and negative electrode plates generate electrochemical energy through a reaction between the electrolyte and the positive and negative electrode plates, and the generated energy is transferred to the exterior of the battery cell 10 through the positive and negative electrode terminals 11 and 12. A vent 13 is provided between the positive and negative electrode terminals 11 and 12 to serve as a path through which gas can be expelled to the exterior of the battery cell 10.

In this embodiment, the battery cell 10 will be described as a prismatic lithium ion secondary battery, however the present invention is not limited thereto as various other types of batteries such as a lithium polymer battery and a cylindrical battery can instead be used.

The battery module 110 may include a plurality of battery cells 10, a pair of first and second end plates 111 and 112 provided to be spatially spaced apart from each other, and connection members 113 and 114 that connect the first and second end plates 111 and 112 to each other.

The first and second end plates 111 and 112 are disposed to come in surface contact with the outermost battery cells 10, respectively, to apply pressure toward insides of the plurality of battery cells 10. The connection members 113 and 114 connect the first and second end plates 111 and 112 to each other. One end of each of the connection members 113 and 114 are fastened to the first end plate 111, and the other end of each of the connection members 113 and 114 are fastened to the second end plate 112. In this instance, the first and second end plates 111 and 112 may be fastened to the connection members 113 and 114 by members such as bolts and nuts.

The connection members 113 and 114 provide a space in which the plurality of battery cells 10 are aligned by connecting the first and second end plates 111 and 112 to each other, and simultaneously support both side surfaces and a bottom surface of each of the battery modules 110. Referring to FIG. 2, it has been illustrated in this embodiment that the connection members 113 and 114 are provided with two side connection members 113 that respectively support both side surfaces of the battery module 110 and one bottom connection member 114 that supports the bottom surface of the battery module 110, however the locations and shapes of the connection members 113 and 114 may be variously modified according to the design of the battery module 110.

The battery cells 10 are fixed in the space defined by the first and second end plates 111 and 112, the side connection members 113 and the bottom connection member 114 so as not to be easily moved by an external impact. Here, the positive and negative electrode terminals 11 and 12 of two adjacent battery cells 10 may be electrically connected to each other through a bus-bar 15. The bus-bar 15 is provided with holes through which the positive and negative electrode terminals 11 and 12 can pass, respectively. The bus-bar 15, to which the terminals are connected by passing through the holes, may be fixed by members such as nuts 16.

The barrier 115 may be interposed between adjacent battery cells 10. A spacer (not shown) is provided to the barrier 115. The barrier 115 allows the battery cells 10 to be spaced apart from each other and form a space between neighboring battery cells 10, thereby providing a flow path for the coolant that cools the battery cells 10. The coolant flows into the space provided by the barrier 115 between the battery cell 10 and exchanges heat with the battery cells 10 by coming in contact with the wide surfaces of the battery cells 10. Then, the coolant is discharged in a direction similar to that in which the coolant flows.

Figure 3A:
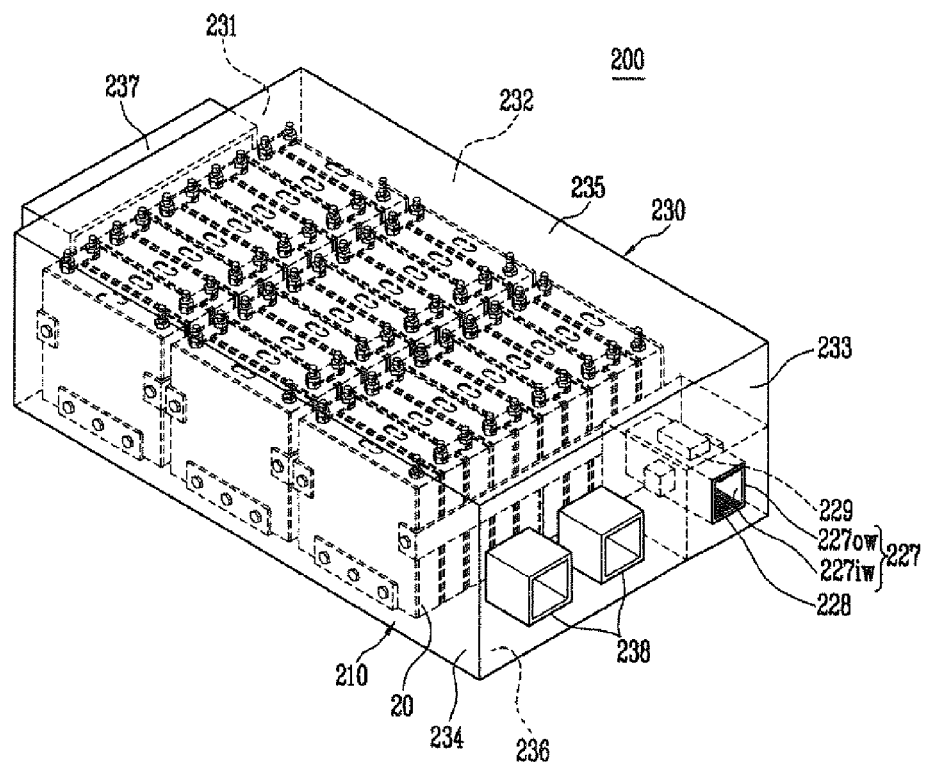
FIG. 3A is a perspective view schematically showing a battery pack according to a second embodiment of the present invention.
Figure 3B:
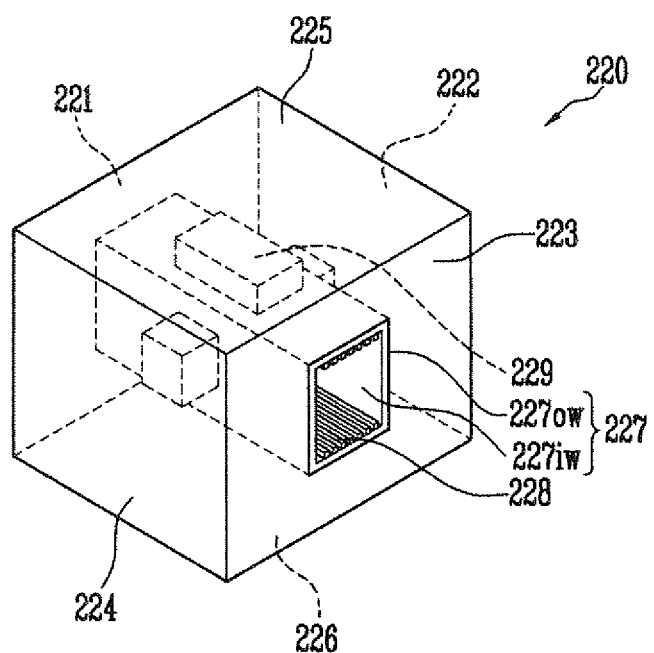
FIG. 3B is a perspective view showing a junction box included in the battery pack of FIG. 3A.

Next, a battery pack according to a second embodiment of the present invention will be described with reference to FIGS. 3A and 3B. Referring now to FIGS. 3A and 3B, FIG. 3A is a perspective view schematically showing a battery pack 200 according to a second embodiment of the present invention and FIG. 3B is a perspective view showing a junction box 220 included in the battery pack 200 of FIG. 3A.

The battery pack 200 according to the second embodiment of the present invention is different from the battery pack 100 according to the first embodiment in regards to the location in which a junction box 220 is disposed. Hereinafter, differences from the first embodiment will be mainly described, and overlapping descriptions will be omitted.

Referring to FIGS. 3A and 3B, the six surfaces of the housing 230 are defined by a housing bottom surface 236 adjacent to a bottom surface 226 of the junction box 220, a housing top surface 235 opposite to the housing bottom surface 236, a coolant inlet surface 231 having an inlet 237 formed thereon, a coolant outlet surface 233 having an outlet 238 formed thereon, a first housing side surface 232 simultaneously positioned between the coolant inlet surface 231 and the coolant outlet surface 233 and between the housing bottom surface 236 and the housing top surface 235, and a second housing side surface 234 opposite to the first housing side surface 232.

The six surfaces of the junction box 220 are defined by the bottom surface 226 adjacent to the housing bottom surface 236, a top surface 225 opposite to the bottom surface 226, a first surface 221 adjacent to battery modules 210, and second, third, fourth surfaces 222, 223 and 224 disposed clockwise with respect to the first surface 221. Among the surfaces of the junction box 220 of FIG. 3A, the third surface 223 is disposed facing the coolant outlet surface 233 of the housing 230, and the second surface 222 is disposed facing the first housing side surface 232. Here, the second surface 222 of the junction box 220 may be disposed opposite from the second housing side surface 234.

In the junction box 220 according to the second embodiment of the present invention, the center of the third surface 223 may be arranged at one side of and be spaced-apart from a is vertical center line of coolant outlet surface 233 of housing 230. That is, the junction box 220 may not disposed at the center of the coolant outlet surface 233 of the housing 230 and by may instead be disposed at a corner of the coolant outlet surface 233 of the housing 230.

Accordingly, an outlet 238 according to the second embodiment of the present invention is disposed at a side of the coolant outlet surface 233 on which the junction box 220 is not disposed.

An electronic component 229 is provided within the junction box 220. The electronic component 229 is disposed to come in contact with an outer wall 227ow of the sleeve 227. Meanwhile, a heat dissipation member 228 formed in the shape of a heat dissipation fin is provided on an inner wall 227iw of the sleeve 227. The heat dissipation member 228 may actually be a plurality of heat dissipation members disposed at a predetermined interval on the inner wall 227iw of the sleeve 227.

Here, the electronic component 229 is a heat generating component that generates a large amount of heat, such as a resistor, fuse or relay, which is a protection element against overcurrent and overload. The heat generated as described above may deteriorate battery cells 20 and cause the battery cells 20 to have a non-uniform heat distribution.

However, in the present invention, the heat dissipation member 228 is disposed on the inner wall 227iw of the sleeve 227 that is in contact with the electronic component 229 of the junction box 220, so that the electronic component 229 can be easily cooled. Since the coolant flows within the sleeve 227 while coming in contact with the inner wall 227iw of the sleeve 227, is the heat dissipation efficiency of the heat dissipation member 228 can be more improved. Further, the sleeve 227 is formed in the junction box 220, so that it is possible to reduce a pressure drop generated due to the coolant being conventionally slowed down by the front of the junction box. Thus, the heat dissipation efficiency can be more improved, and the temperature variation between the battery cells 20 can be decreased.

Figure 4A:
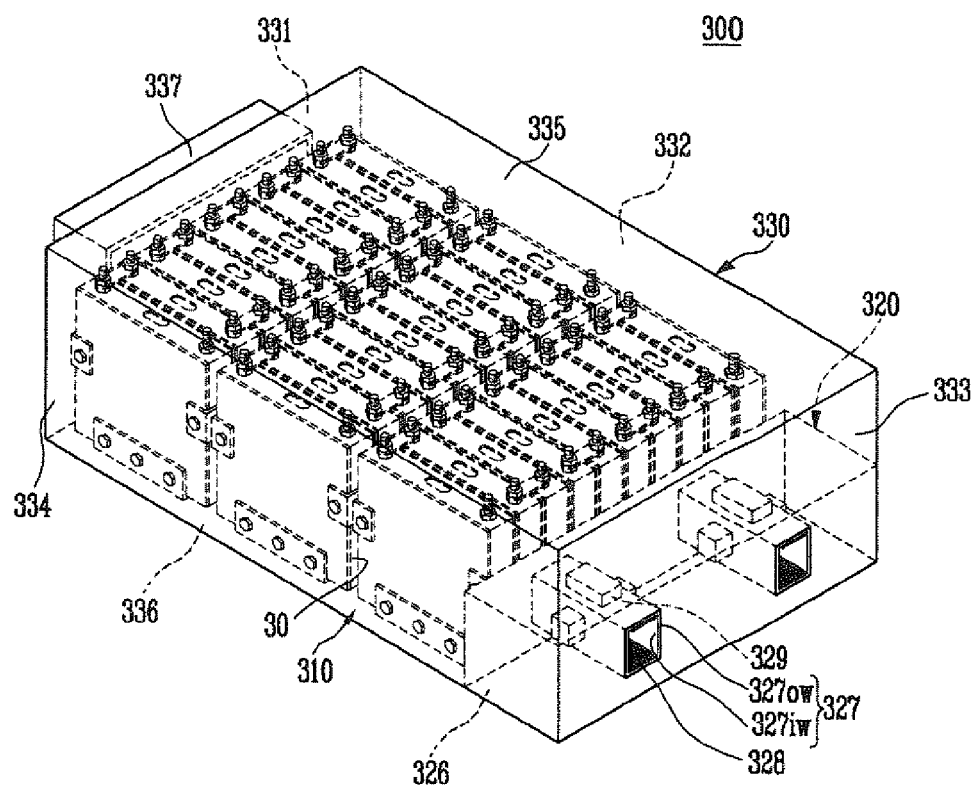
FIG. 4A is a perspective view schematically showing a battery pack according to a third embodiment of the present invention.
Figure 4B:
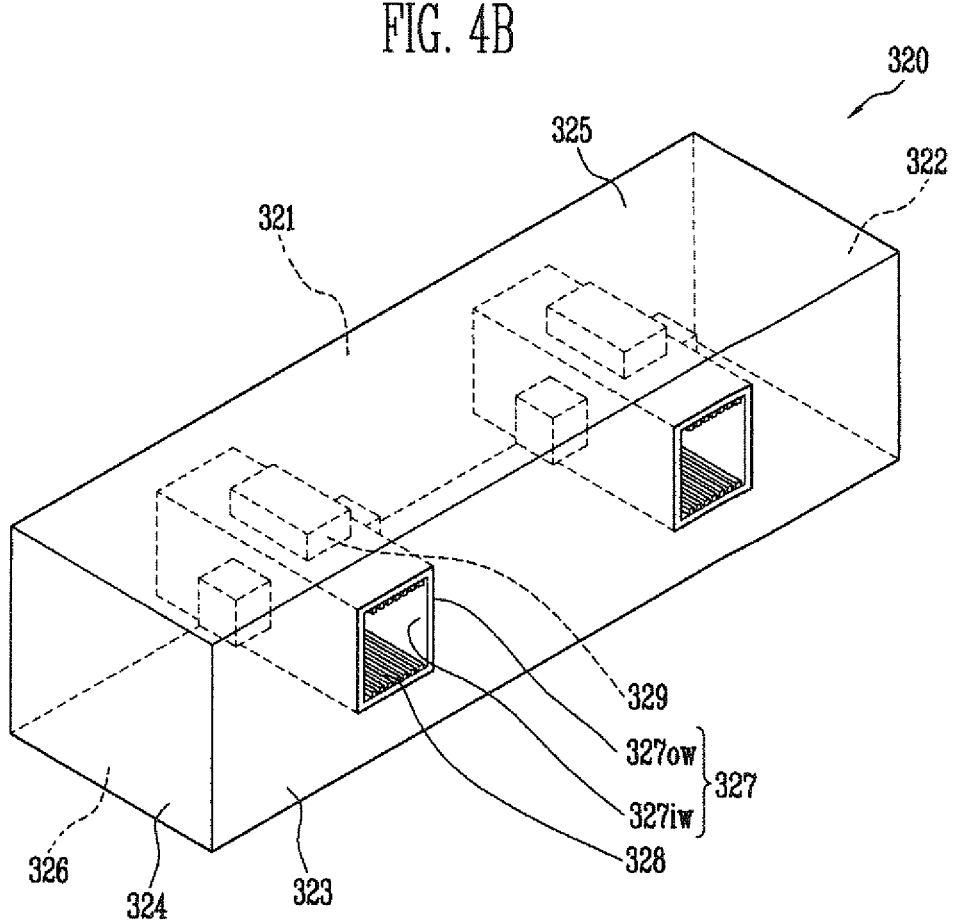
FIG. 4B is a perspective view showing a junction box included in the battery pack of FIG. 4A.

Next, a battery pack according to a third embodiment of the present invention will be described with reference to FIGS. 4A and 4B. Referring now to FIGS. 4A and 4B, FIG. 4A is a perspective view schematically showing a battery pack 300 according to a third embodiment of the present invention and FIG. 4B is a perspective view showing a junction box 320 included within the battery pack 300 of FIG. 4A.

The battery pack 300 according to the third embodiment is different from those according to the first two embodiments in regard to the location in which a junction box 320 is disposed and the number of sleeves 327 and through-holes that perforate the junction box 320. Hereinafter, differences from the first two embodiments will be mainly described, and overlapping descriptions will be omitted.

Referring to FIGS. 4A and 4B, the six surfaces of the housing 330 are defined by a housing bottom surface 336 adjacent to a bottom surface 326 of the junction box 320, a housing top surface 335 opposite to the housing bottom surface 336, a coolant inlet surface 331 having an inlet 337 formed thereon, a coolant outlet surface 333 formed opposite to the coolant inlet surface 331, a first housing side surface 332 simultaneously positioned between the coolant inlet surface 331 and the coolant outlet surface 333 and between the housing bottom surface 336 and the housing top surface 335, and a second housing side surface 334 arranged opposite from the first housing side surface 332.

The six surfaces of the junction box 320 are defined by the bottom surface 326 adjacent to the housing bottom surface 336, a top surface 325 opposite to the bottom surface 326, a first surface 321 adjacent to battery modules 310, and second, third, fourth surfaces 322, 323 and 324 disposed clockwise with respect to the first surface 321. Among the surfaces of the junction box 320 of FIG. 4A, the third surface 323 is disposed adjacent to the coolant outlet surface 333 of the housing 330, and the second and fourth surfaces 322 and 324 are disposed adjacent to the first and second housing side surfaces 332 and 334 of the housing 330, respectively. In the third embodiment, the third surface 323 of the junction box 320 may extend across an entire width of the coolant outlet surface 333 of the housing 330.

Two sleeves 327 are provided within the junction box 320 and can serve as a coolant outlet for the battery pack 300. Accordingly, a separate outlet is not provided to the battery pack 300 according to the third embodiment of the present invention.

Electronic components 329 are provided within the junction box 320. Each electronic component 329 is disposed to come in contact with an outer wall 327ow of the sleeve 327. Meanwhile, heat dissipation members 328 formed in the shape of a heat dissipation fins are provided on an inner wall 327iw of the sleeve 327. Each heat dissipation member 328 includes a plurality of heat dissipation members, and the plurality of heat dissipation members is disposed at a predetermined interval on the inner wall 327iw of each of the sleeves 327.

Here, the electronic components 329 are heat generating components that generate a large amount of heat, such as a resistor, fuse or relay, which is a protection element against overcurrent and overload. The heat generated as described above may deteriorate battery cells 30.

However, in the present invention, the heat dissipation members 328 are disposed on the inner walls 327iw of the sleeves 327, which comes in contact with the electronic components 329 of the junction box 320, so that the electronic components 329 can be easily cooled. Since the coolant flows within the sleeves 327 while coming in contact with the inner walls 327iw of the sleeves 327, the heat dissipation efficiency of the heat dissipation members 328 can be more improved. Particularly, the two sleeves 327, each having a heat dissipation member 328 is disposed within junction box 320, so that the heat dissipation efficiency can be more improved as compared with the first two embodiments. Further, through-holes or passageways are formed within each sleeve 327 so that it is possible to reduce a pressure drop generated because the flow of the coolant is conventionally slowed down by the front of the junction box. Thus, the heat dissipation efficiency can be more improved, and the temperature variation between the battery cells can be decreased.

Figure 5A:
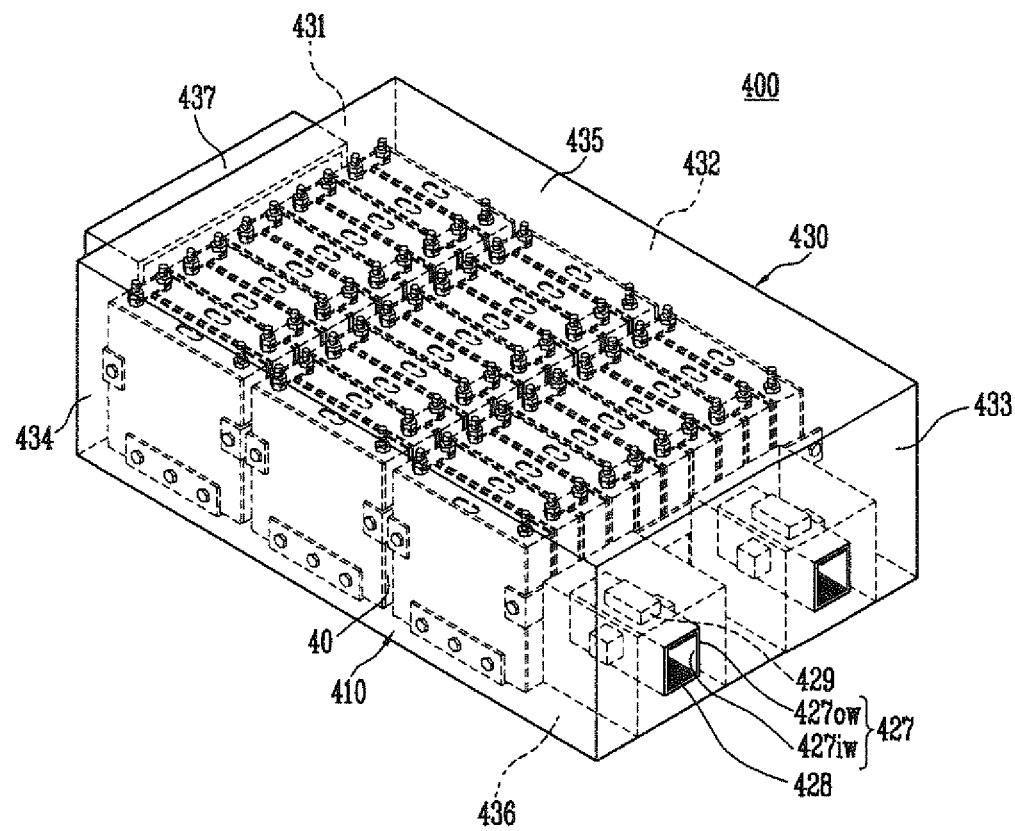
FIG. 5A is a perspective view schematically showing a battery pack according to a fourth embodiment of the present invention.
Figure 5B:
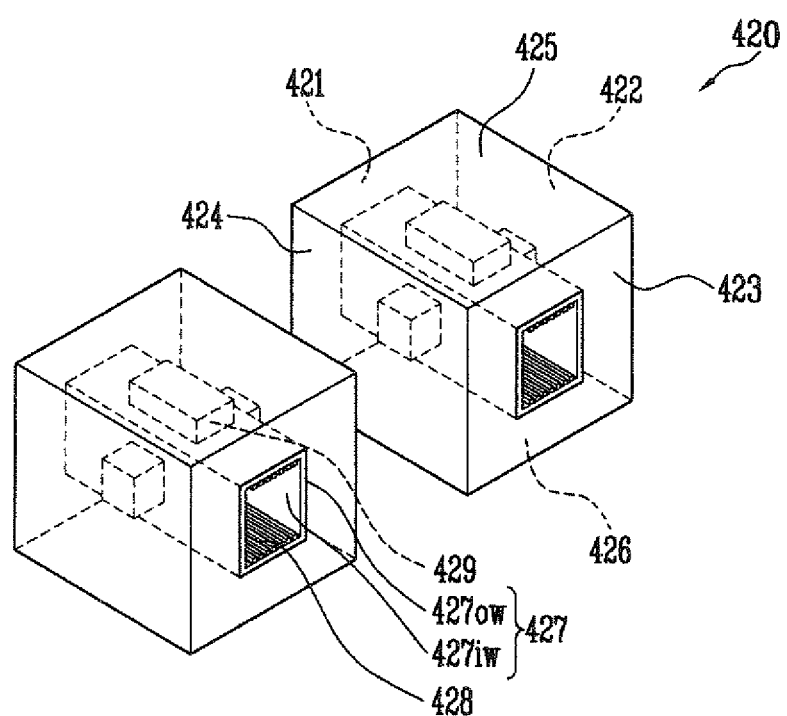
FIG. 5B is a perspective view showing a junction box included in the battery pack of FIG. 5A.

Next, a battery pack according to a fourth embodiment of the present invention will be described with reference to FIGS. 5A and 5B. Referring now to FIGS. 5A and 5B, FIG. 5A is a perspective view schematically showing a battery pack 400 according to a fourth embodiment of the present invention and FIG. 5B is a perspective view showing a junction box 420 included within the battery pack 400 of FIG. 5A.

The battery pack 400 according to the fourth embodiment is different from those according to the first, second and third embodiments in the number of junction boxes 420. Hereinafter, differences from the first, second and third embodiments will be mainly described, and overlapping descriptions will be omitted.

Referring now to FIGS. 5A and 5B, the six surfaces of the housing 430 are defined by a housing bottom surface 436 adjacent to a bottom surface 426 of the junction box 420, a housing top surface 435 opposite to the housing bottom surface 436, a coolant inlet surface 431 having an inlet 437 formed thereon, a coolant outlet surface 433 formed opposite to the coolant inlet surface 431, a first housing side surface 432 simultaneously positioned between the coolant inlet surface 431 and the coolant outlet surface 433 and between the housing bottom surface 436 is and the housing top surface 435, and a second housing side surface 434 opposite to the first housing side surface 432.

The six surfaces of the junction box 420 are defined by the bottom surface 426 adjacent to the housing bottom surface 436, a top surface 425 opposite to the bottom surface 426, a first surface 421 adjacent to battery modules 410, and second, third, fourth surfaces 422, 423 and 424 disposed clockwise with respect to the first surface 421. Among the surfaces of the junction box 420 of FIG. 5A, the third surface 423 is disposed adjacent to the coolant outlet surface 433 of the housing 430, and two junction boxes 420 are spaced-apart from each other by a predetermined interval.

Since sleeves 427 are provided in each of the two junction boxes 420, respectively, the two sleeves 427 can serve as the coolant outlet for the battery pack 400. Accordingly, a separate outlet is not necessary for the battery pack 400 according to the fourth embodiment of the present invention as shown in FIG. 5A. If desired, an outlet may be provided at a location on the coolant outlet surface 433 on which the junction boxes 420 are not disposed.

An electronic component 429 is provided within each of the junction boxes 420. Each electronic component 429 is disposed to come in contact with an outer wall 427ow of a respective sleeve 427. Meanwhile, a heat dissipation member 428, such as a heat dissipation fin, is provided on an inner wall 427iw of each sleeve 427. The heat dissipation member 428 may actually be a plurality of heat dissipation members, and the plurality of heat dissipation members may be disposed at a predetermined interval on the inner wall 427iw of each sleeve 427.

Here, the electronic components 429 generate a large amount of heat, and can be a resistor, fuse or relay, which can be protection elements that prevent overcurrent and overload conditions from occurring. The heat generated as described above by the electronic components 429 may deteriorate battery cells 40 and cause a non-uniform heat distribution among the battery cells 40.

However, in the present invention, the heat dissipation members 428 are disposed on inner walls 427iw of the sleeves 427, which comes in contact with the electronic component 429 of the junction box 420, so that the electronic components 429 can be easily cooled. Since the coolant flows through the sleeve 427 while coming in contact with the inner wall 427iw of the sleeve 427, the heat dissipation efficiency of the heat dissipation members 428 can be more improved. Particularly, when two junction boxes 420 are included, the two sleeves 427 each having the heat dissipation member 428 are included, so that the heat dissipation efficiency can be more improved as compared with the first two embodiments. Further, the sleeves 427 are formed in each junction box 420, so that it is possible to reduce a pressure drop generated due to the flow of the coolant being conventionally slowed down by the front of the junction box. Thus, the heat dissipation efficiency can be more improved, and the temperature variation s between the battery cells 40 can be decreased.

According to the embodiments of the present invention, it is possible to provide a battery pack capable of improving heat dissipation characteristics and reducing the temperature variation between cells.

Further, it is possible to provide a battery pack in which a heat-sink structure is disposed within a junction box so as to cool heat generated from an electronic component within the junction box, thereby preventing the deterioration of battery cells.

Accordingly, it is possible to provide a battery pack having an improved cooling efficiency, in which a battery cell is not easily deteriorated even though it is charged and discharged a plurality of times.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
at least one battery module including a plurality of battery cells aligned in one direction;
a housing that accommodates the at least one battery module and includes a coolant How path arranged therein; and
a junction box arranged at a predetermined location in a vicinity of the battery module, the junction box having a sleeve arranged parallel to the coolant flow path through which a coolant flows, the junction box including an electronic component selected from a group consisting of a resistor, a fuse and a relay.

2. The battery pack of claim 1, wherein the housing is provided with at least one inlet through which the coolant may enter the housing is provided with at least one outlet through which the coolant may he discharged from the housing.

3. The battery pack of claim 2, wherein the outlet for the housing is the sleeve of the junction box, wherein the coolant exits the housing via the sleeve of the junction box.

4. The battery pack of claim 1, wherein the electronic component of the junction box is a protection element that protects the battery module from overcurrent and overload.

5. The battery pack of claim 1, wherein the junction box comprises at least a first sleeve and a second sleeve, wherein the first and the second sleeves are arranged parallel to each other and are spaced-apart from each other by a predetermined interval.

6. The battery pack of claim 1, wherein, when defining six surfaces of the junction box as a bottom surface adjacent to a bottom surface of the housing, a top surface opposite from the bottom surface, a first surface adjacent to the battery module, and second, third and fourth surfaces arranged clockwise with respect to the first surface, the third surface being arranged adjacent to a coolant outlet surface of the housing.

7. The battery pack of claim 1, wherein the junction box is arranged symmetrically about a vertical center line of a coolant outlet surface of the housing.

8. The battery pack of claim 1, wherein the junction box is entirely arranged on one side of a vertical center line of a coolant outlet surface of the housing, and one of the second and fourth surfaces of the junction box is arranged adjacent to a side surface of the housing, the side surface being adjacent to both a coolant inlet surface and the coolant outlet surface of the housing.

9. The battery pack of claim 5,wherein both the second and fourth surfaces of the junction box are arranged adjacent to respective side surfaces of the housing.

10. The battery pack of claim 1, wherein the battery pack comprises a plurality of junction boxes spaced-apart from each other by a predetermined interval, each of the junction boxes including a sleeve that is a through hole and a passageway for the coolant to pass and he expelled from the housing.

11. The battery pack of claim 1, wherein the electronic component is arranged on an outer wall of the sleeve and is a heat generating element.

12. The battery pack of claim 1, wherein the junction box includes a heat dissipation fin arranged on an inner Wall of the sleeve.

13. The battery pack of claim 1, wherein the junction box further comprises a plurity of heat dissipation fins arranged on an inner wall of the sleeve to dissipate heat generated by the electronic component.

14. The battery pack of claim 11, wherein the junction box further includes a plurality of heat dissipation members arranged at a predetermined interval on the inner wall of the sleeve and being in contact with the electronic component.

15. The battery pack of claim 1, wherein a section of the sleeve in a thickness direction has a shape selected from a group consisting of a circle, an ellipse and a polygon.

16. The battery pack of claim 1, wherein the coolant includes a fluid selected from a group consisting of a liquid and a gas.

17. The battery pack of claim 1, wherein wires for supplying electricity to various electric equipment and motor driving devices are connected through the junction box.

18. The battery pack of claim 1, the sleeve being a through hole in the junction box and is as passageway through which the coolant flows.

19. The battery pack claim 5, wherein the first and second sleeves are the only coolant outlets for the housing.

20. The battery pack claim 1, wherein the sleeve, is one of as plurality of coolant outlets for th battery pack.

* * * * *